(12) United States Patent
Diep et al.

(10) Patent No.: US 8,960,606 B2
(45) Date of Patent: Feb. 24, 2015

(54) CIRCUMFERENCE SPLICE FOR JOINING SHELL STRUCTURES

(71) Applicant: The Boeing Company, Chicago, IL (US)

(72) Inventors: Paul Diep, Bothell, WA (US); Bernhard Dopker, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 192 days.

(21) Appl. No.: 13/665,664

(22) Filed: Oct. 31, 2012

(65) Prior Publication Data

US 2014/0117157 A1 May 1, 2014

(51) Int. Cl.
*B64C 1/12* (2006.01)
*B64C 1/06* (2006.01)

(52) U.S. Cl.
CPC ............... *B64C 1/069* (2013.01); *B64C 1/064* (2013.01); *B64C 1/12* (2013.01)
USPC .......................................... 244/132; 244/131

(58) Field of Classification Search
CPC .......... B64C 1/069; B64C 1/068; B64C 1/12; B64C 1/064
USPC ....................... 244/131, 132, 120, 119, 117 R
See application file for complete search history.

(56) References Cited

U.S. PATENT DOCUMENTS

| 4,606,961 | A | 8/1986 | Munsen et al. | |
|---|---|---|---|---|
| 7,325,771 | B2 | 2/2008 | Stulc et al. | |
| 8,215,584 | B2* | 7/2012 | Cazeneuve et al. | 244/131 |
| 8,398,027 | B2* | 3/2013 | Wood | 244/131 |
| 8,453,975 | B2* | 6/2013 | Dietrich et al. | 244/120 |
| 8,480,031 | B2* | 7/2013 | Gauthie et al. | 244/120 |
| 8,714,488 | B2* | 5/2014 | Burns et al. | 244/131 |
| 2010/0320322 | A1* | 12/2010 | Reye et al. | 244/120 |
| 2012/0104170 | A1* | 5/2012 | Gallant et al. | 244/132 |
| 2012/0153082 | A1 | 6/2012 | Rosman et al. | |

FOREIGN PATENT DOCUMENTS

| EP | 1 566 334 | 8/2005 |
|---|---|---|
| WO | WO 2011/001050 | 1/2011 |

OTHER PUBLICATIONS

Extended European Search Report, EP 13 18 9955 (2014).

* cited by examiner

*Primary Examiner* — Tien Dinh
*Assistant Examiner* — Richard R Green
(74) *Attorney, Agent, or Firm* — Walters & Wasylyna LLC (57) ABSTRACT

The disclosed shell structure splice and method may include a first panel having a first edge, a second panel having a second edge, the second edge being positioned in edgewise alignment with the first edge to form a splice joint, a strap bridging the splice joint and attached to the first panel and the second panel, the strap having a first tapered region and a second tapered region, a first fitting having a tapered section and a flat section, the tapered section being attached to the first tapered region of the strap, and a second fitting having a tapered section and a flat section, the tapered section being attached to the second tapered region of the strap.

19 Claims, 10 Drawing Sheets

CIRCUMFERENCE SPLICE FOR JOINING SHELL STRUCTURES

FIELD

The present disclosure generally relates to the joining of shell structures and, more particularly, to a splice joint for joining together adjacent sections of a shell structure, such as fuselage sections of an aircraft.

BACKGROUND

The primary structural elements of large aircrafts are typically made from metal or composite materials. For example, the fuselage shells of such aircraft may typically be manufactured from high-strength aluminum alloys or fiber-reinforced resin materials that have relatively high strength-to-weight ratios.

An aircraft may include two or more fuselage, i.e., shell, sections, which are bridged and fastened together circumferentially at a splice joint to interconnect the fuselage sections and form the complete fuselage structure. To precisely install the integration joints, the fuselage sections are aligned and attachment holes are drilled through the connecting splice plates and the underlying shell structure. For example, adjacent fuselage sections may be joined by a splice consisting of a frame or bulkhead that is positioned in the interior of the fuselage and bridges between adjacent fuselage section stringers. A plurality of fittings extend through the frame and facilitate the continuity of the fuselage sections. As another example, adjacent fuselage sections may be integrated together by the splice plate and a plurality of splice fittings attached between a pair of adjacent fuselage sections to bridge the interface between the adjacent fuselage sections. Generally the splice plate is flat and forms a flat splice chord that extends across the splice joint. Depending upon the type of splice joint, the assembly may require a plurality of mouse holes disposed in the frame or bulkhead through which extend the splice fittings.

Typically, a splice fitting may be formed of a metallic material, such as titanium. Since titanium is a relatively expensive material, the material and manufacturing costs associated with a titanium splice fitting may increase the costs associated with production of the aircraft.

Additionally, fuselage sections may splice together by a plurality of fasteners that extend through the frame to connect the frame to the fuselage sections and a plurality of fasteners that extend through the splice fittings to connect the fittings to the fuselage sections. In order to install the fasteners, a plurality of attachment holes must be drilled through the splice for receiving the fasteners. A disadvantage of such an assembly process is that the drilling of holes through a dissimilar material stack that contain titanium splice fittings takes a significant amount of time, thereby increasing the time required to assemble the fuselage sections as well as the labor costs associated with such assembly. Furthermore, the holes drilled through a splice fitting made of titanium or other metallic material generally require the parts to be separated and deburred, thereby further adding to the time and costs associated with the assembly of the fuselage. Another disadvantage of such an assembly process is that shims may be required to align the fuselage section and fit the splice fittings along the joint interface, thereby adding even more time and cost.

Accordingly, those skilled in the art continue with research and development efforts in the field of joining shell structures, particularly in the field of aircraft assembly.

SUMMARY

In one embodiment, the disclosed shell structure splice may include a first panel having a first edge, a strap attached to the first panel and extending beyond the first edge, the strap having a first tapered region, and a first fitting having a tapered section and a flat section, the tapered section being attached to the first tapered region of the strap. A frame is optionally connected to the strap.

In another embodiment, the disclosed shell structure splice may include a first panel having a first edge, a second panel having a second edge, the second edge being positioned in edgewise alignment with the first edge to form a splice joint, a strap bridging the splice joint and attached to the first panel and the second panel, the strap having a first tapered region and a second tapered region, a first fitting having a tapered section and a flat section, the tapered section being attached to the first tapered region of the strap, and a second fitting having a tapered section and a flat section, the tapered section being attached to the second tapered region of the strap.

In another embodiment, the disclosed splice for joining adjacent panels of a shell structure may include a strap having a first side, a second side, a generally flat middle region, a first tapered region extending downwardly proximate the middle region to proximate the first side, and a second tapered region extending downwardly proximate the middle region to proximate the second side, a first fitting having a tapered section and a flat section, the tapered section being attached to the first tapered region of the strap, and a second fitting having a tapered section and a flat section, the tapered section being attached to the second tapered region of the strap. A Z-section or a C-section frame may be attached to the middle flat section of the splice strap.

In another embodiment, disclosed is a method of joining a shell structure, the method may include the steps of: (1) providing a first panel of the shell structure having a first edge, (2) providing a strap having a first tapered region and a second tapered region, (3) positioning the strap adjacent to the first edge such that the first tapered region is adjacent to the first panel and the second tapered region extends outwardly from the first edge, (4) attaching the strap to the first panel, (5) providing a first fitting having a tapered section and a flat section, (6) positioning the first fitting such that the tapered section is adjacent to the first tapered region of the strap and the flat section is adjacent to the first panel, (7) attaching the first fitting to the strap, and (8) attaching the first fitting to the first panel.

In yet another embodiment, disclosed is a method of joining a shell structure, the method may include the steps of: (1) providing a first panel of the shell structure having a first edge, (2) providing a strap having a first tapered region and a second tapered region, (3) positioning the strap adjacent to the first edge such that the first tapered region is adjacent to the first panel and the second tapered region extends outwardly from the first edge, (4) attaching the strap to the first panel, (5) providing a first fitting having a tapered section and a flat section, (6) positioning the first fitting such that the tapered section is adjacent to the first tapered region of the strap and the flat section is adjacent to the first panel, (7) attaching the first fitting to the strap, (8) attaching the first fitting to the first panel, (9) providing a second panel of the shell structure having a second edge, (10) positioning the second panel adjacent to the first panel such that the first and second edges are in edgewise alignment forming a splice joint and the second tapered section is adjacent to the second panel and the strap bridges the splice joint, (11) attaching the strap to the second panel, (12) providing a second fitting having a tapered section and a flat section, (13) positioning the second fitting such that the tapered section is adjacent to the second tapered region of the strap and the flat section is adjacent to the second panel, (14) attaching the second fitting to the strap, and (15) attaching the second fitting to the second panel.

Other embodiments of the disclosed grafted bonding surface will become apparent from the following detailed description, the accompanying drawings and the appended claims.

DETAILED DESCRIPTION

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Figure 1:
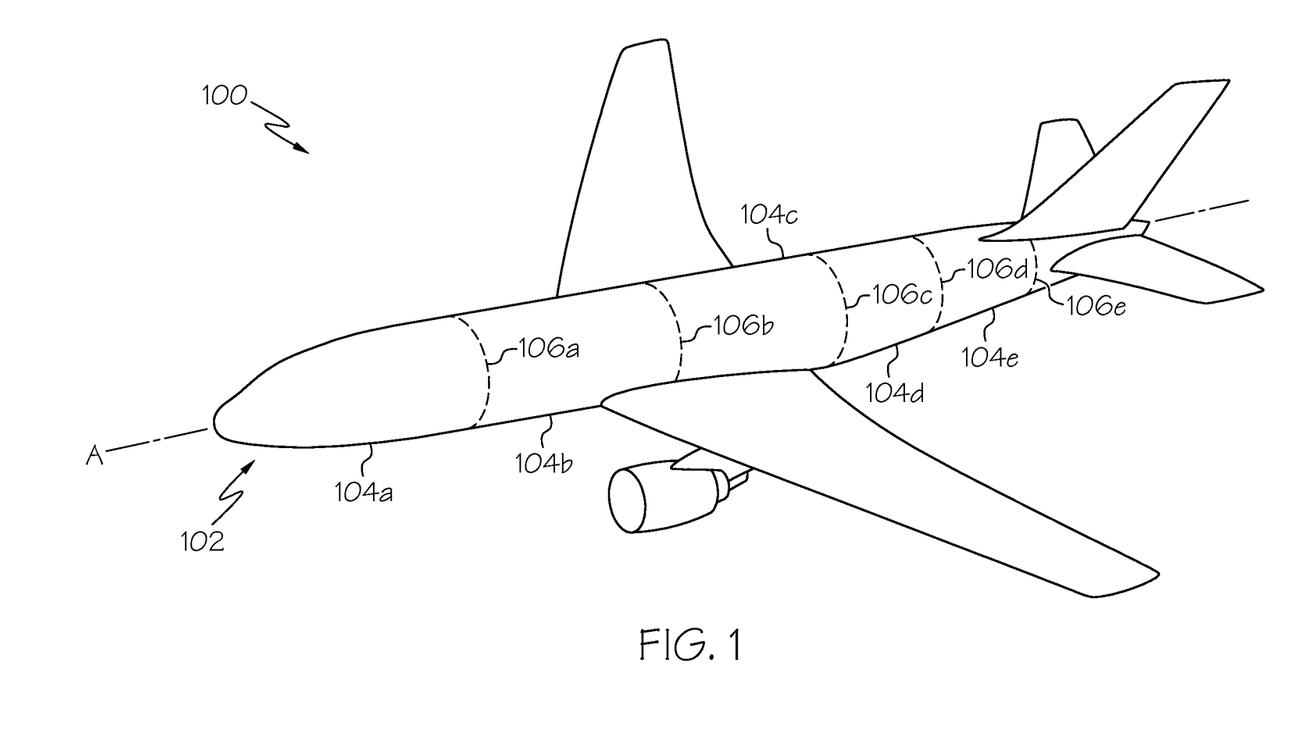
FIG. 1 is a perspective view of an aircraft assembled in accordance with the present disclosure.
Figure 2:
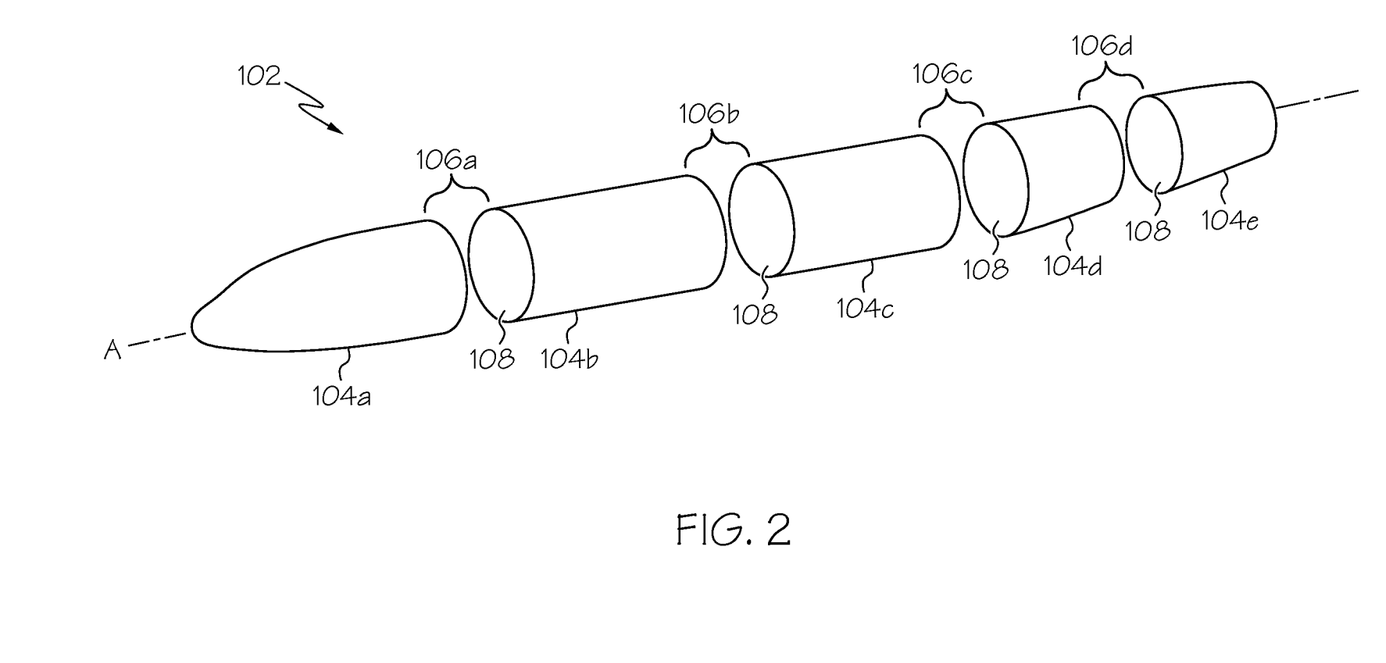
FIG. 2 is an exploded perspective view of a plurality of fuselage sections of the aircraft of FIG. 1.

Referring to FIGS. 1 and 2, an aircraft 100 may include a fuselage 102 having a plurality of fuselage sections 104 (identified individually as fuselage sections 104a-e). The fuselage sections 104 may be joined together by a plurality of corresponding splice joints 106 (identified individually as splice joints 106a-e).

Each fuselage section 104 may include a composite skin 108 extending three hundred sixty degrees (360°) around a longitudinal axis A of the fuselage 102. Throughout this disclosure, the term "fuselage section" is used for convenience to refer to any shell structure extending three hundred sixty degrees (360°) around an axis. It can be appreciated by one skilled in the art that a fuselage section 104 may not be limited to generally cylindrical structures, but may include structures having circular, elliptical, oval, egg-shaped, rectilinear, tapered, or other cross-sectional shapes. In addition, one skilled in the art can appreciate that the fuselage sections 104 may be one-piece sections in which the skins 108 are one-piece skins extending continuously for three hundred sixty degrees (360°) around the axis or can be formed from two or more skin segments joined together to form the full three hundred sixty degree) (360°) fuselage section 104.

The fuselage 102 may further include a passenger cabin configured to hold a plurality of passenger seats. Each fuselage section 104 may also include a plurality of window cutouts (not shown) to provide the passengers seated in the passenger cabin with views out of the aircraft 100. The fuselage 102 may also include passenger doors, cargo doors, antennae and the like.

Figure 3:
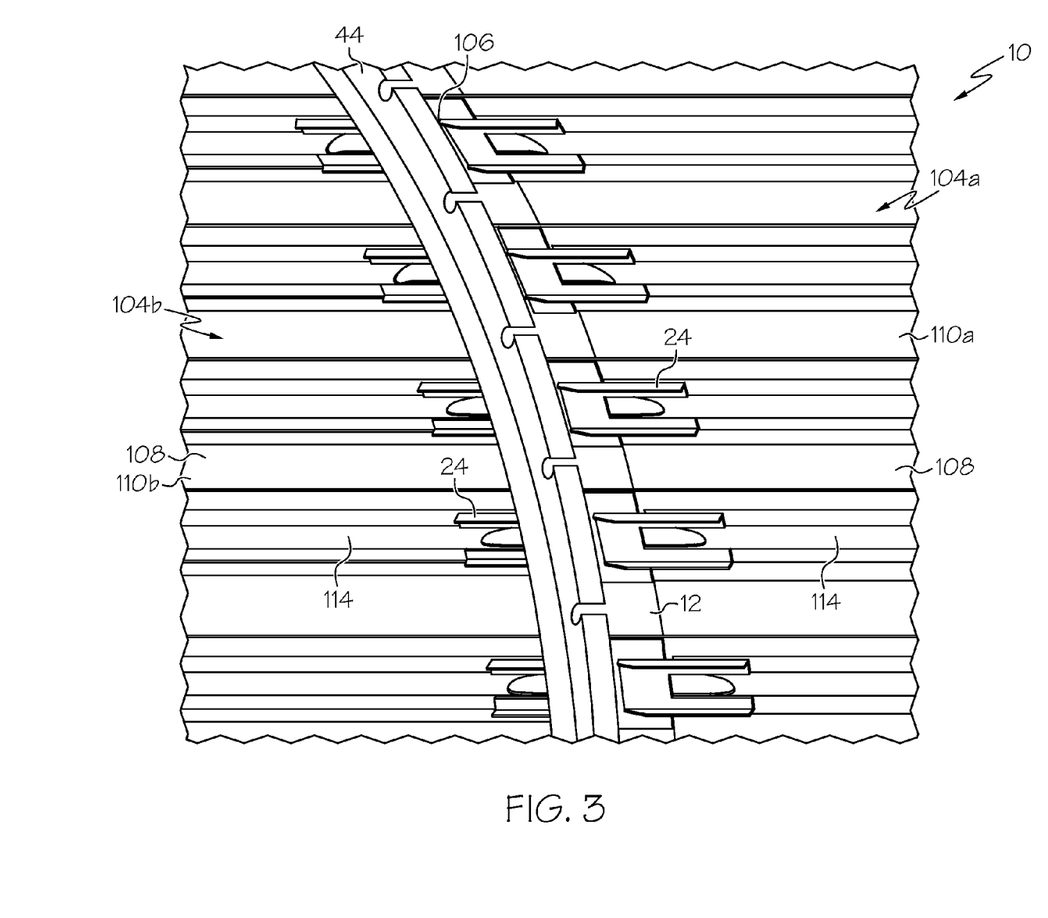
FIG. 3 is a partial perspective view of a splice joint between adjacent fuselage sections of the aircraft of FIG. 1.

Referring to FIG. 3, a splice, generally designated 10, may bridge between and structurally join a pair of adjacently positioned fuselage sections 104 defining the splice joint 106 therebetween. This view is looking outwardly at a portion of a splice joint 106 from within the fuselage 102. The splices 10 may be generally located at opposed ends of the fuselage sections 104. The splice 10 may be positioned interior of the fuselage sections 104 to integrate the fuselage sections 104 and provide strength and stability to the resulting fuselage 102. Although only a portion of the circumferentially extending splice 10 is illustrated in FIG. 3, the splice may extend about the entire inner circumference of the fuselage sections 104 or may extend about only one or more portions thereof.

Each fuselage section 104 may include a panel 110 (identified individually as a first panel 110a and a second panel 110b). A first fuselage section 104a may include a first panel 110a and a second fuselage section 104b may include a second panel 110b positioned in edgewise alignment with the first panel 110a. In one embodiment, the panels 110 may be at least generally similar in structure and function to known panel portions of aircraft fuselage sections. For example, the panel 110 may include a plurality of stiffeners or stringers 114 attached to the skin 108. The skin 108 may be attached to and covers the plurality of stringers 114 to form the exterior surface of the fuselage section 104.

Referring to FIGS. 4-8, each stringer 114 may include a raised portion 116 projecting away from the skin 108 and a plurality of flange portions 118 attached directly to the skin 108. In the illustrated embodiment, the stringers 114 may have generally "U"-shaped cross-sections. However, it can be appreciated by one skilled in the art that the stringers 114 may have other cross-sectional shapes, including "L" shapes, "C" shapes, inverted "T" shapes, "I" shapes, etc. In yet other embodiments, the panels 110 may include other features; such as support members or offsets mated to the flange portions 118 of the stringers 114.

The stringers 114 may be positioned on the skin 108 so that the flange portion 118 of one stringer 114 is aligned with a corresponding flange portion 118 of an adjacent stringer 114. By aligning the flange portions 118 in such a manner, the flange portions 118 may form a plurality of at least approximately continuous support surfaces extending between the raised portions 116 of the stringers 114. In another embodiment, as illustrated, the stringers 114 may be spaced apart on the skin 108 so that the flange portion 118 of one stringer 114 is circumferentially offset (or otherwise spaced apart) from a corresponding flange portion 118 of an adjacent stringer 114.

Referring next to FIGS. 4-8, which depict a segment of the splice joint 106 to more clearly illustrate the disclosed splice 10. The splice 10 may include a strap 12 that extends at least partially circumferentially about the splice joint 106 of the fuselage sections 104. The strap 12 may have a width, as defined in the longitudinal direction of the fuselage 102, which is sufficient to bridge across and overlie portions of both of the adjacent fuselage sections 104.

The strap 12 may include a bottom surface 14 to contact the skin 108 of the adjacent panels 110. The bottom surface 14 may be curved and the curvature of the bottom surface may correspond to the curvature of the fuselage 102 (FIG. 2). A flat bottom surface 14 is also contemplated.

Opposing sides 16 (identified individually in FIGS. 4 and 5 as first side 16a and second side 16b) of the strap 12 may extend away from the splice joint 106 and may be attached to an edge 120 (identified individually in FIGS. 4 and 5 as first edge 120a and second edge 120b) of the skin 108. A top surface 18 of the splice strap 12 may include a generally flat middle region 20 and opposing downwardly tapered regions 22 (identified individually in FIGS. 4-6 as first tapered region 22a and second tapered region 22b) extending from proximate (i.e., at or near) the middle region 20 to proximate the sides 16. As illustrated, in one embodiment, the splice strap 12 may have a generally isosceles trapezoid cross sectional shape; however, it can be appreciated by one skilled in the art that the strap 12 may have other generally trapezoidal shapes or other polygonal shapes.

As will be described in more detail herein, in one embodiment, the strap 12 may be formed of a composite material, such as a carbon-fiber-reinforced polymer (CFRP), a composite fiber reinforced polymer, a graphite-epoxy, or similar material, so as to provide the strength and stability required to structurally join the adjacent fuselage sections 104 while reducing the material costs, weight, and drilling and assembly time relative to more conventional splices that utilize metal splice parts. In other embodiments, the strap 12 may include other materials, including metallic materials such as aluminum, titanium, steel, etc.

The strap 12 may be attached proximate the first edge 120a of the skin 108 of the first panel 110a and proximate the second edge 120b of the skin 108 of the second panel 110b to splice the panels 110 together. The strap 12 may extend continuously, or at least approximately continuously, around the splice joint 106. Alternatively, the strap 12 may be segmented around the splice joint 106; for example, the splice joint 106 may include a plurality of segments of the strap 12. The strap 12 may be attached to an inner side of the respective skins 108 to maintain a smooth, aerodynamic surface on the exterior of the fuselage 102. The strap 12 may be attached to the skins 108 by a plurality of fasteners extending through the strap 12 and the skins 108. Alternatively, the strap 12 may be bonded to the skins 108 or bonded and fastened to the skins 108.

The strap 12 may be at least approximately as thick as the skins 108, but thicker than adjacent flange portions 118 of the stringers 114. In one embodiment, as illustrated, stringers 114 do not extend completely to the edge 120 the skin 108 and the sides 16 of the strap 12 may extend proximate the terminal end of the stringers 114. In other embodiments, the stringers 114 may extend to and terminate at the edge 120 of the skin 108. If needed to avoid a step between adjacent surfaces, shim pads or fillers (not shown) may be positioned on the flange portions 118 adjacent to the strap 12. The fillers may include composite materials, metallic materials, or similar materials. In other embodiments, the strap 12, the skins 108, and the flange portions 118 may have other relative thicknesses such that fillers may not be needed.

The splice 10 may also include a plurality of splice fittings 24 (identified individually as a first fitting 24a and a second fitting 24b) that are disposed upon the strap 12 and that extend in a longitudinal direction away from the splice joint 106. Each fitting 24 may include a first end 26, a second end 28, and longitudinal sides 30. A base 32 of the fitting 24 may include an upwardly tapered section 34 extending proximate the first end 26 and a generally flat section 36 extending proximate the tapered section 34 to proximate the second end 28. The fittings 24 may be formed of a composite material, such as carbon fiber reinforced plastic or similar material, such as the same composite that forms the strap 12. Alternatively, the fittings 24 may be formed from a metal or metal alloy.

In the illustrated embodiment, the upwardly tapered section 34 of the fitting 24 may include a correspondingly complimentary (i.e., opposing) upward angle relative the angle of the downwardly tapered region 22 of the strap 12, such that the tapered section 34 of the bottom surface 32 may make flush contact with the tapered region 22 of the strap top surface 18. The tapered section 34 may have a width, as defined in the longitudinal direction of the fuselage 102, which is sufficient to extend across and overlie the tapered region 22 the strap 12. The flat section 36 of the fitting 24 may extend beyond the side 16 of the strap 12 so as to overlie the skin 108 of the panel 110. A fitting 24 may be attached to the both tapered regions 22 of the strap 12, such that a pair of fittings 24 extends longitudinally beyond the opposed sides 16 of the strap 12 away from the splice joint 106 so as to overlie the adjacent fuselage sections 104.

As shown in the illustrated embodiment, each fitting 24 may include a first longitudinal member 38 and a second longitudinal member 40 that extend beyond the sides 16 of the strap 12. Generally the longitudinal members 38, 40 may define the flat section 36 of the fitting 24. The longitudinally extending members 38, 40 may be configured to overlie and receive at least a portion of the stringer 114 of a respective panel 110.

For example, in one embodiment, each fitting 24 may be generally "U"-shaped such that each longitudinal member 38, 40 may be spaced apart from one another and overlie a respective stringer 114. The fittings 24 of this embodiment may include the tapered section 34 that extends across the width of the tapered region 22 of the strap 12 and the longitudinal members 38, 40 that extend outwardly from the tapered section 34 beyond the side 16 of the strap 12. However, the tapered section 34 of the fitting 24 may have other widths relative to the tapered region 22 of the strap 12 and as such, the tapered section 22 of the fitting 12 may not need to extend across the entire width of the tapered region 22 of the strap 12. Alternatively, the tapered section 34 of the fitting 24 may extend beyond the tapered region 22 of the strap 12 in other embodiments.

In other embodiments, the flat section 36 of the fitting 24 may include a single longitudinal member that extends beyond the side 16 of the strap 12. In such an embodiment, the flat section 36 may be suitably sized, i.e. the distance between longitudinal sides 30, to fit between the raised portions 116 of adjacent stringers 114.

The splice 10 may include a plurality of fittings 24 overlying different circumferentially spaced portions of the strap 12. The plurality of fittings 24 may be spaced apart from one another in a circumferential direction such that a portion of the strap 12 may not be covered by a fitting 24 and may be exposed or visible between neighboring, i.e., adjacent, fittings 24. As such, the strap 12 may be visually inspected to confirm that the strap 12 remains properly secured to the skin 108 of the fuselage sections 104. Alternatively, the plurality of fittings 24 may be abutted against one another in a circumferential direction such that the entire strap 12 may be covered by fittings 24.

In the illustrated embodiment, each fitting 24 may have a channel or "U"-shaped cross section that includes the base 32, formed of the tapered section 34 and the flat section 36, and opposing upstanding edges 42 (identified individually as a first upstanding edge 42a and a second upstanding edge 42b). A first upstanding edge 42a being positioned toward a first longitudinal side 30a and a second upstanding edge 42b being positioned toward a second longitudinal side 30b. In other embodiments, the fittings 24 may have other cross-sectional shapes, including "C" shapes, "L" shapes, inverted "Pi" shapes, and flat shapes.

The upstanding edges 42 may add stiffness to the fittings 24 and may be positioned proximate to the raised portions 116 of the stringers 114 depending upon the dimensions of the flat section 36 of the fitting 24 and the spaced apart distance of the stringers 114. The upstanding edges 42 may increase the stability of the splice joint 106, especially under compression loads.

If a segmented strap 12 is used, then the fittings 24 may also be used as splice plates for adjacent strap segments. An advantage of the disclosed splice joint 106 is that the ends of the stringers 114 are left open, which enables moisture caused by condensation and other sources to escape the stringers 114 for sufficient drainage.

Yet another advantage of the disclosed splice 10 is that the raised portions 116 of opposing stringers 114 are not spliced together across the splice joint 106, which may make the fittings 24 relatively easy to install because the raised portions 116 do not have to be in perfect alignment. Additionally, the ability to shift or adjust the position of the fitting 24 along both sides 16 of the strap 12 allows the longitudinal members 38, 40 to receive the raised portion 116 of the stringer 114 if not perfectly aligned with an opposing stringer 114.

The splice 10 may optionally include a frame 44 that extends circumferentially about at least a portion of the splice joint 106 between adjacent fuselage sections 104. The frame 44 may be generally positioned to overlie the middle region 20 of the strap 12 between longitudinally opposed fittings 24. In the illustrated embodiment, the frame 44 may have a generally "Z" shape configured to have an upturned lower flange 46 to be fastened to the strap 12. The lower flange 46 may be segmented into a plurality of feet, which may be fastened to the strap 12, as illustrated in FIG. 3. The frame 44 may also include a downturned upper flange 48 to be fastened to an exterior of the inner cabin walls of the fuselage 102. The upper flange 48 may be segmented into feet in a similar manner as described for the lower flange 46. While a Z-shaped frame 44 is shown, those skilled in the art will appreciate that any suitable frame may be used, such as a C-shaped frame, an I-shaped frame, a J-shaped frame or the like.

The frame 44 may also be formed of a composite material, such as CFRP or similar material, such as the same composite that forms the strap 12 or the fittings 24. Alternatively, the frame 44 may be formed of a metallic or other material, such as aluminum or titanium.

Although the disclosed splice 10 is illustrated as being built up from a number of separate parts (e.g., the strap 12, the fittings 24, the frame 44), in other embodiments, two or more of these parts may be integrated into a single part that performs the function or has the features of the two or more parts.

Figure 9:
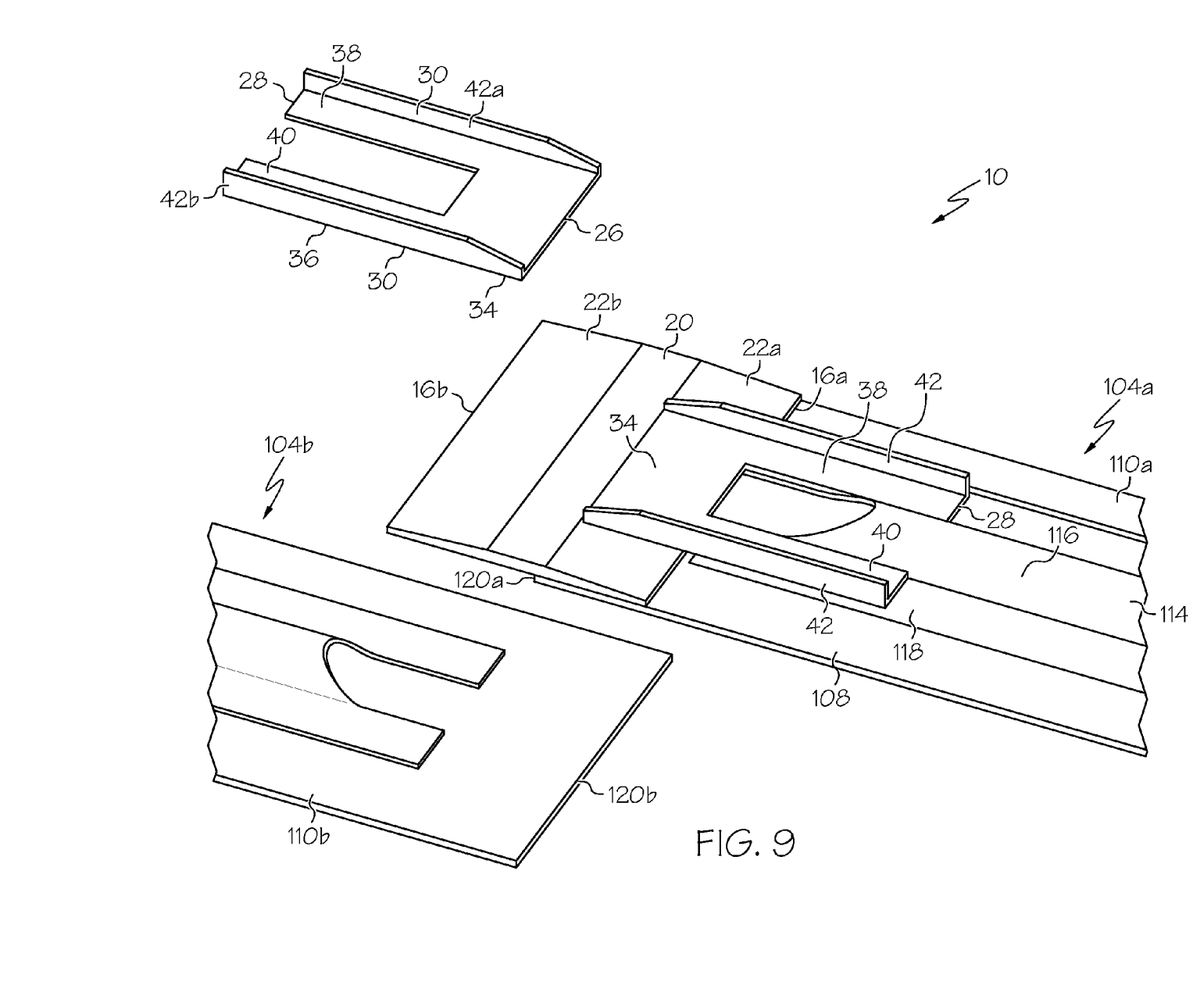
FIG. 9 is a partial exploded perspective view of the splice.

Referring next to FIG. 9, a benefit of the disclosed splice 10 is the contemplated elimination of the need for metal components, such as titanium metal components, in the splice joint 106 and the significant reduction (if not complete elimination) of the need for shims or non-conformance tags during assembly of the fuselage 102. Another benefit of the disclosed splice 10 is the significant reduction in manufacturing flow times of fuselage 102 assembly contemplated by installing, i.e., fastening, the splice strap 12 and a portion of the plurality of splice fittings 24a to the first fuselage section 104a prior to integration of the adjacent second fuselage section 104b and corresponding portion of the plurality of longitudinally opposed splice fittings 24b. Optionally, the frame 44 may also be installed prior to integration of the second fuselage section 104b.

Figure 4:
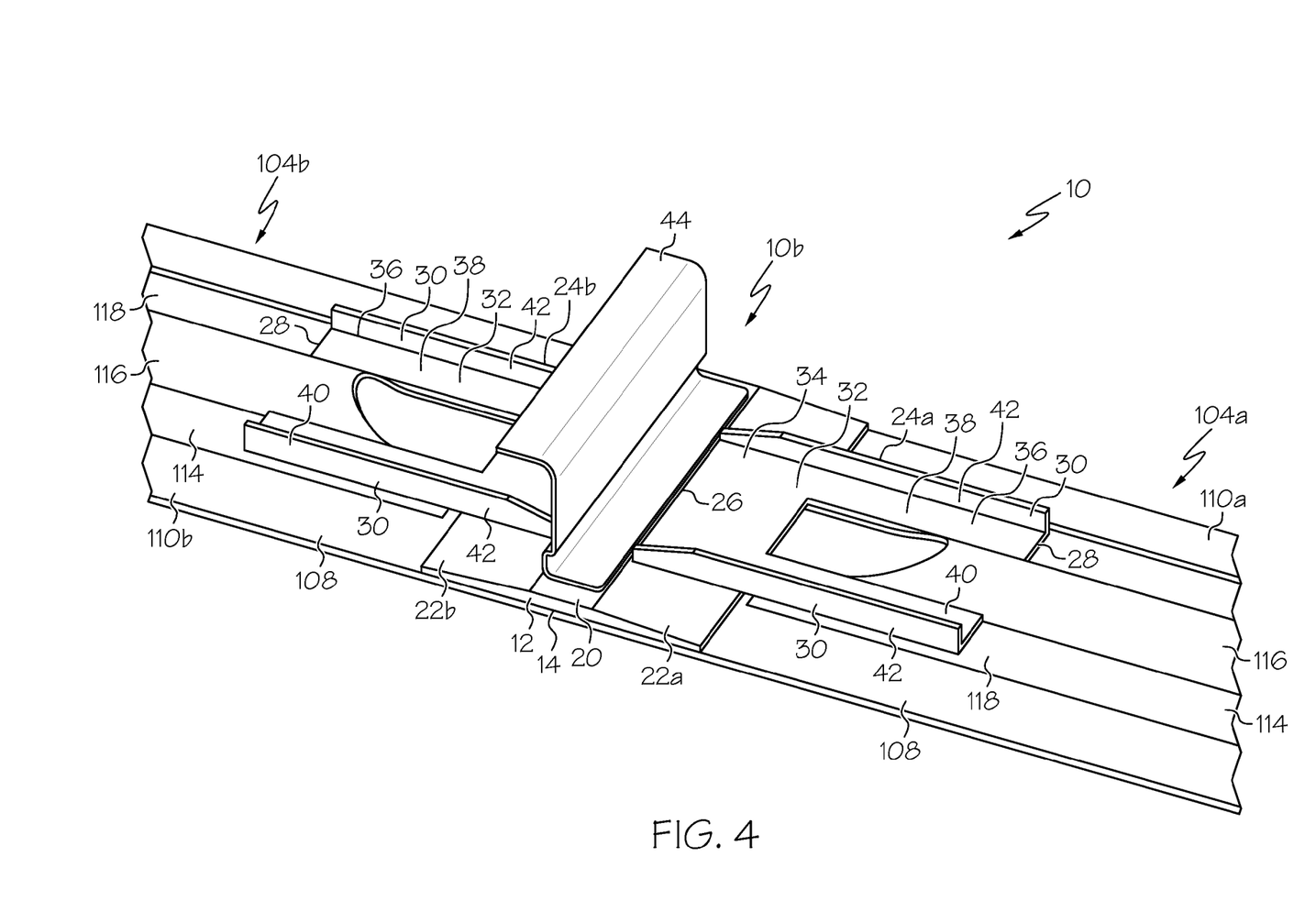
FIG. 4 is a partial perspective view of single splice of the splice joint of FIG. 3.
Figure 5:
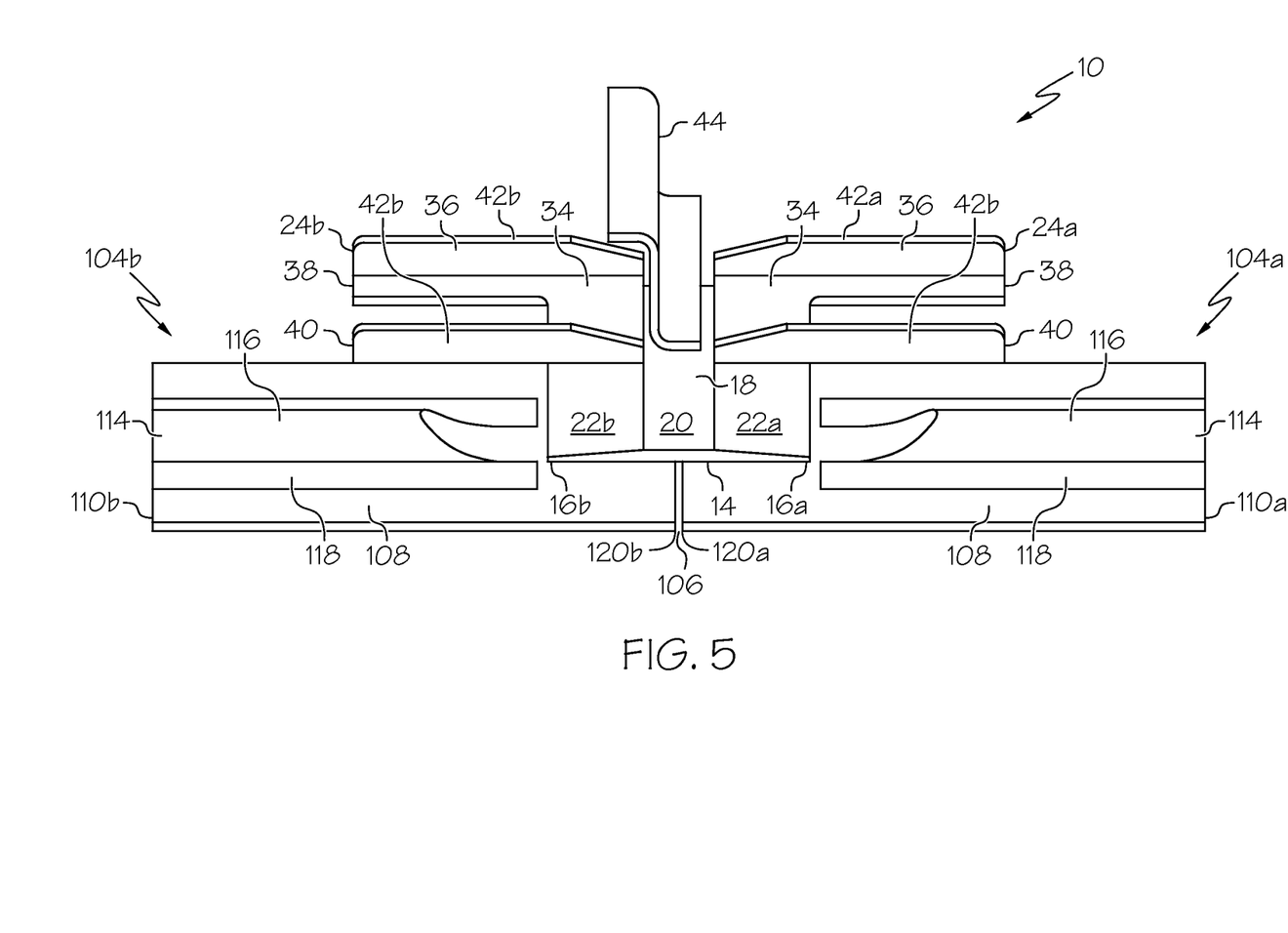
FIG. 5 is a partially exploded side perspective view of the splice of FIG. 4.
Figure 6:
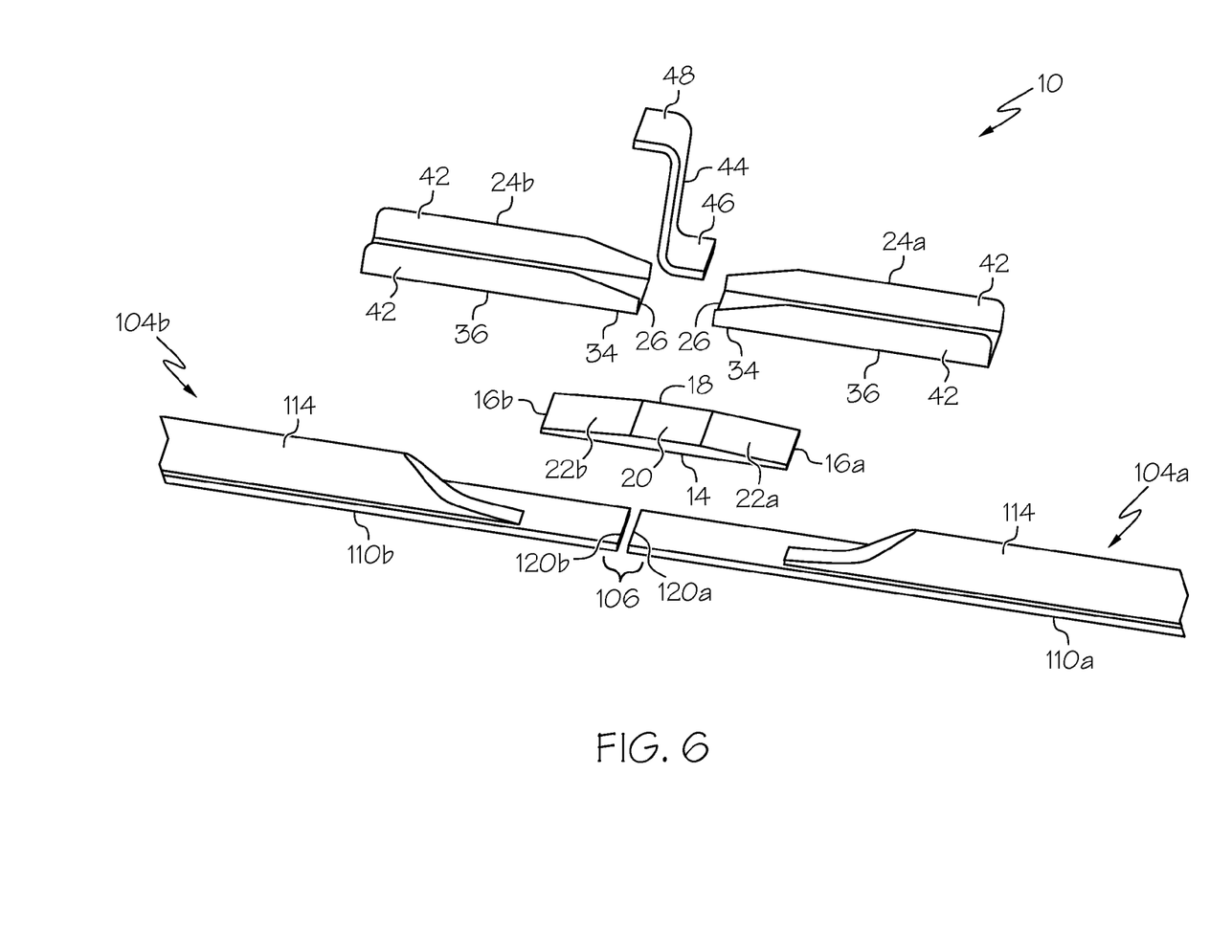
FIG. 6 is a partially exploded top perspective view of the splice of FIG. 4.
Figure 7:
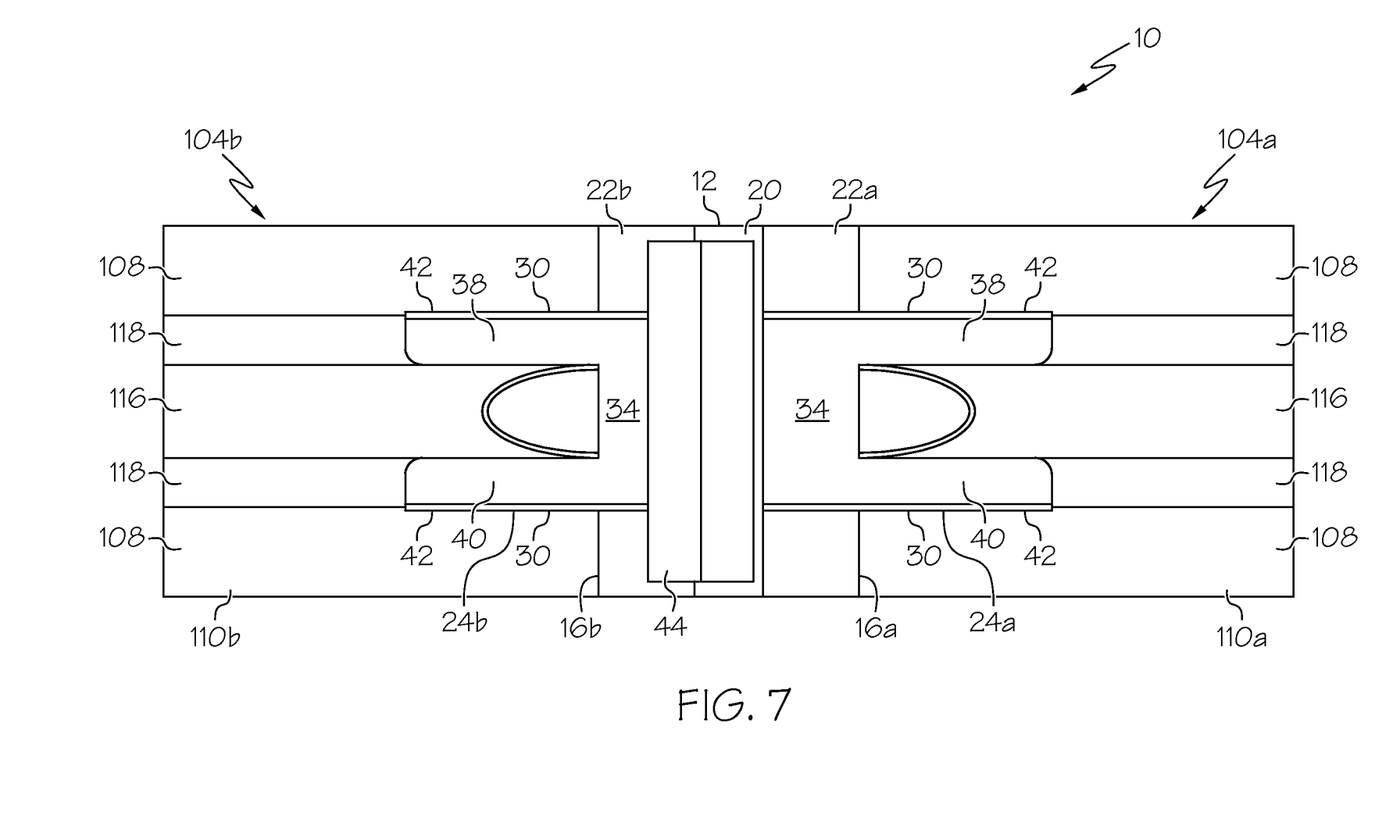
FIG. 7 is a top view of the splice of FIG. 4.
Figure 8:
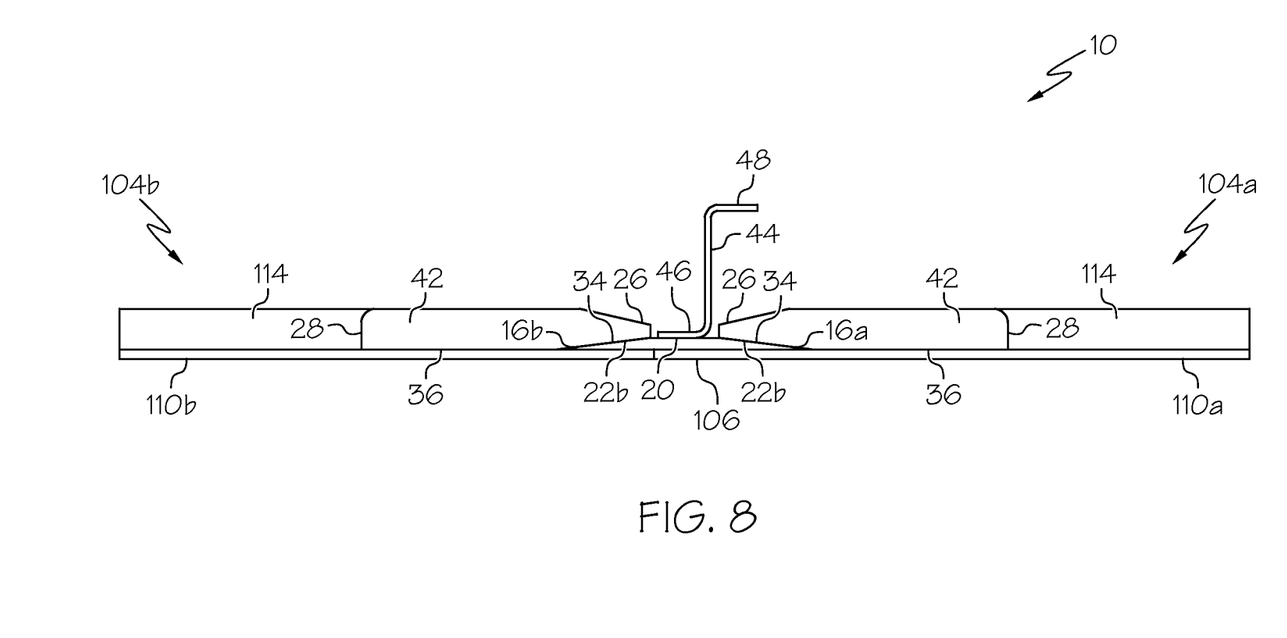
FIG. 8 is a side view of the splice of FIG. 4.

As best illustrated in FIGS. 4, 6, and 8, the interface between the tapered region 22 of the strap 12 and the tapered sections 34 of the fittings 24 allow for the fittings 24 to be fastened to the strap 12 and the panel 110 without the requirement of shimming and allows for location allowances between the adjacent fuselage sections 104 and fittings 24. For example, during installation of the fittings 24, each fitting 24 may be shifted longitudinally forward or rearward, i.e., fore and aft, relative to the strap 12 to account for varying thicknesses and termination locations of flange portions 118 of the stringers 114 to provide for a shimless splice joint 106. The opposing tapered surfaces of the strap 12 and the fittings 24 may also minimize centroid shifting throughout the splice joint 106, which may reduce out of plane loads along the splice joint 106. Additionally, the tapered interface may also lessen load transfer at the fasteners and more evenly transfer load forces between the splice members, i.e., the strap 12, the fittings 24, and butt joined fuselage sections 104.

Figure 10:
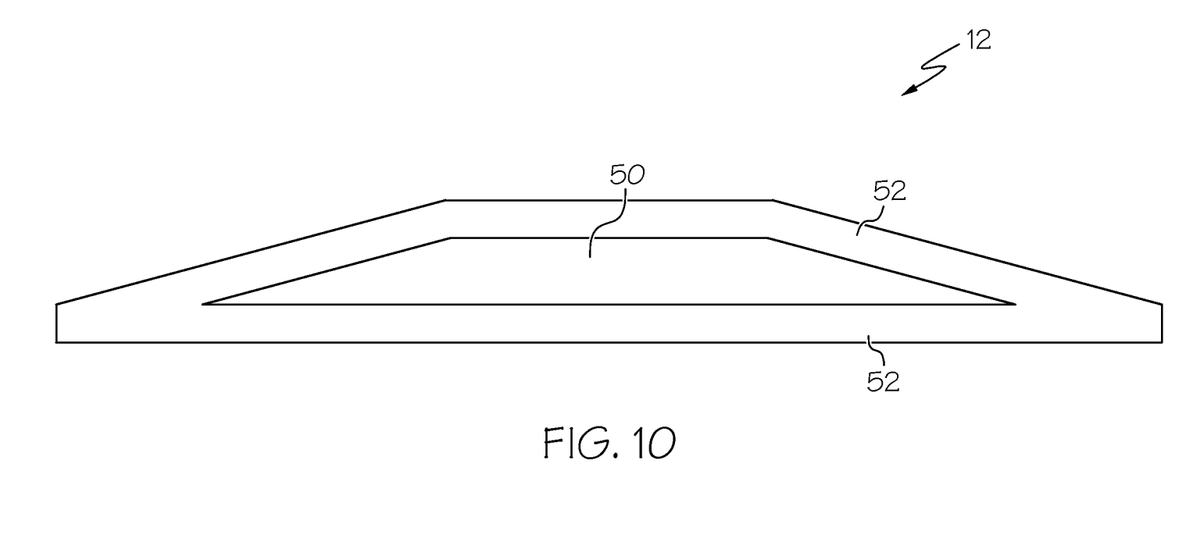
FIG. 10 is a cross section view of a splice plate of the disclosed splice.

Referring to FIG. 10, the splice strap 12 may be formed through composite ply dropping to internally achieve the tapered regions 22 without the requirement of post formation machining The splice fittings 24 may also be formed through composite ply dropping to internally achieve the tapered section 34 without the requirement of post formation machining The strap 12 and the fittings 24 may include an internal tapered structure 50 surrounded by a plurality of fiber layers and a cured resin, i.e., composite ply 52, to form a composite structure. For example, the strap 12 may include an exterior continuous fiber zone and an internal tapered fiber zone. A plurality of plies may laid up to form a lower continuous fiber zone. Another plurality of plies may be laid up within a perimeter border of the lower continuous fiber zone to form the tapered fiber zone or tapered structure 50. Alternatively, the tapered structure 50 may be formed from alternate materials. Another plurality of plies may be laid up over the tapered fiber zone to form an upper continuous fiber zone. The plies 52 may be pre-impregnated composite layers. The splice fittings 24 may be formed through a substantially similar process to form the tapered section 34 of the base 32.

One advantage of using composite materials instead of metals is that the strap 12, fittings 24, and the underlying panels 110 (e.g., the skins 108 and stringers 114) may have at least generally similar coefficients of thermal expansion. As a result, temperature fluctuations experienced during operation of the aircraft 100 may not cause disparate thermal expansion between the splice 10 and the underlying panels 110, which may not induce significant stresses in the splice joint 106. Another advantage of using composite materials is the elimination of the need for dissimilar material isolation.

It can be appreciated by one skilled in the art that in addition to composites and metal materials, in yet other embodiments, the panels 110, the strap 12, and the fittings 24, and combinations thereof, may include other materials, including hybrid materials such as fiber/metal laminates, including fiberglass/aluminum laminates and titanium reinforced graphite laminates (Ti/Gr).

The splice 10 may includes a plurality of fasteners that join the components of the splice 10 to one another and to the fuselage sections 104. Various fastener patterns for which the fasteners may be installed in order to connect the splice 10 to the fuselage sections 102 may be utilized and have not been illustrated. The fasteners may extend through the strap 12; the frame, such as about the lower flange 46; and the fittings 24, such as both the tapered section 34 and the longitudinally extending members 38, 40 of the flat section 36 so as to connect the components to one another and to the fuselage sections 104.

In order to install the plurality of fasteners, a plurality of holes must be formed, such as by drilling, in the various components of the splice 10 so as to receive respective fasteners. Since a number of the holes, and in certain embodiments a majority of the holes, may be formed through components, e.g., the strap 12, the fittings 24, and optionally the frame 44, that are formed of a composite material, such as CFRP, the holes may be formed more rapidly and efficiently than the formation of comparable holes through titanium or other metal components. Additionally, the holes that are formed through the composite components of a splice 10 may be formed even more efficiently and cost effectively than comparable holes formed through comparable metal or titanium components since the components of the splice 10 need not be separated and deburred.

Another advantage of the disclosed splice 10 is that the components may be fastened with titanium fasteners, as opposed to Inconel® or other steel fasteners, since composite components may not be as sensitive to fatigue load in the same manner as comparable metal parts. As such, the composite components generally do not require the high level of clamp-up forces required by metal parts that utilize Inconel® or other steel fasteners.

Although various embodiments of the disclosed splice joint have been shown and described, modifications may occur to those skilled in the art upon reading the specification. The present application includes such modifications and is limited only by the scope of the claims.

What is claimed is:

1. A shell structure splice comprising:
    a first panel comprising a first edge;
    a second panel comprising a second edge, said second edge positioned in edgewise alignment with said first edge of said first panel to form a splice joint;
    a first stringer connected to said first panel and spaced away from said first edge of said first panel;
    a second stringer connected to said second panel and spaced away from said second edge of said second panel;
    a strap connected to said first panel and said second panel bridging said splice joint, said strap comprising a top surface opposite said first panel and said second panel, a flat bottom surface contacting said first panel and said second panel, a first side, and a second side opposite said first side, said top surface defining a flat middle region disposed over said splice joint, a first tapered region extending from proximate said middle region to proximate said first side, and a second tapered region extending from proximate said middle region to proximate said second side;
    a first fitting comprising a first flat section connected to said first stringer and extending to proximate said first side of said strap and a first tapered section extending from proximate said first side to proximate said middle region of said strap and connected to said first tapered region of said strap; and
    a second fitting comprising a second flat section connected to said second stringer and extending to proximate said second side of said strap and a second tapered section extending from proximate said second side to proximate said middle region of said strap and connected to said second tapered region of said strap,
    wherein said first fitting and said second fitting are spaced apart by said middle region of said strap.

2. The splice of claim 1 wherein at least a portion of said first tapered region of said strap is positioned between said first tapered section of said first fitting and said first panel.

3. The splice of claim 1 wherein at least a portion of said second tapered region of said strap is positioned between said second tapered section of said second fitting and said second panel.

4. The splice of claim 1 wherein said first panel and said second panel are fuselage sections of an aircraft.

5. The splice of claim 1 wherein said first tapered region slopes downwardly from said middle region to said first side; and,
    wherein said second tapered region slopes downwardly from said middle region to said second side.

6. The splice of claim 1 wherein said first flat section of said first fitting is attached to said first panel and said second flat section of said second fitting is attached to said second panel.

7. The splice of claim 1 wherein said first flat section of said first fitting and said second flat section of said second fitting each comprises a first longitudinal member and a spaced apart second longitudinal member, wherein a portion of said first stringer fits between said first longitudinal member and said second longitudinal member of said first flat section, and wherein a portion of said second stringer fits between said first longitudinal member and said second longitudinal member of said second flat section.

8. The splice of claim 1 wherein said strap comprises a composite material.

9. The splice of claim 8 wherein said strap further comprises a tapered internal structure surrounded by a carbon fiber reinforced plastic.

10. The splice of claim 1 further comprising a frame attached to said middle region of said strap and disposed between said first fitting and said second fitting.

11. A splice for joining a shell structure comprising a first panel, a first stringer connected to said first panel, a second panel aligned with said first panel, and a second stringer connected to said second panel and aligned with said first stringer, said splice comprising:
    a strap to bridge said first panel and said second panel, said strap comprising a top surface, a bottom surface, a first side, and a second side opposite said first side, said top surface defining a flat middle region, a flat first tapered region extending from proximate said middle region to proximate said first side, and a flat second tapered region extending from said middle region to proximate said second side;
    a first fitting associated with said first stringer, said first fitting comprising a first tapered section contacting at least a portion of said first tapered region of said strap and extending from proximate said middle region to proximate said first side of said strap and a first flat section extending beyond said first side of said strap; and,
    a second fitting associated with said second stringer, said second fitting comprising a second tapered section contacting at least a portion of said second tapered region of said strap and extending from proximate said middle region to proximate said second side of said strap and a second flat section extending beyond said second side of said strap,
    wherein said first fitting and said second fitting are spaced apart by said middle region of said strap.

12. The splice of claim 11 further comprising a frame contacting said middle region of said strap and disposed between said first fitting and said second fitting.

13. The splice of claim 11 wherein said strap comprises a composite material.

14. The splice of claim 13 wherein said strap further comprises a tapered internal structure surrounded by a carbon fiber reinforced plastic.

15. A method of joining a shell structure, said method comprising the steps of:
- positioning a first panel comprising a first stringer and a second panel comprising a second stringer of said shell structure in edgewise alignment to form a splice joint;
- positioning a strap between said first stringer and said second stringer bridging said splice joint, said strap comprising a top surface opposite said first panel and said second panel, a flat bottom surface contacting said first panel and said second panel, a first side, and a second side opposite said first side, said top surface defining a flat middle region disposed over said splice joint, a first tapered region extending from proximate said middle region to proximate said first side, and a second tapered region extending from proximate said middle region to proximate said second side;
- connecting said strap to said first panel and said second panel;
- positioning a first fitting relative to said first stringer and said strap, said first fitting comprising a first flat section and a first tapered section;
- connecting said first tapered section of said first fitting to said first tapered region of said strap;
- connecting said first flat section of said first fitting to at least one of said first panel and said first stringer;
- positioning a second fitting relative to said second stringer and said strap, said second fitting comprising a second flat section and a second tapered section;
- connecting said second tapered section of said second fitting to said second tapered region of said strap; and
- connecting said second flat section of said second fitting to at least one of said second panel and said second stringer,
- wherein said first fitting and said second fitting are spaced apart by said middle region of said strap.

16. The method of claim 15 wherein positioning said first fitting relative to said first stringer and said first strap comprises:
- contacting said first flat section of said first fitting and said first stringer, said first flat section extending to proximate said first side of said strap; and
- contacting said first tapered section and at least a portion of said first tapered region of said strap, said first tapered section extending from proximate said first side to proximate said middle region of said strap, and
- wherein positioning said second fitting relative to said second stringer and said first strap comprises:
- contacting said second flat section of said second fitting and said second stringer, said second flat section extending to proximate said second side of said strap; and
- contacting said second tapered section and at least a portion of said second tapered region of said strap, said second tapered section extending from proximate said second side to proximate said middle region of said strap.

17. The method of claim 15 further comprising the steps of:
- positioning a frame on said middle region of said strap between said first fitting and said second fitting; and
- connecting said frame to said middle region of said strap.

18. The method of claim 17 wherein said first panel and said second panel are fuselage sections of an aircraft.

19. The method of claim 17 wherein at least one of said strap, said first fitting, said second fitting, and said frame comprise a composite material.

* * * * *